US012488850B2

(12) United States Patent
Trichy et al.

(10) Patent No.: US 12,488,850 B2
(45) Date of Patent: Dec. 2, 2025

(54) CAPACITOR HEALTH CHECK FOR DATA STORAGE DEVICES

(71) Applicant: Sandisk Technologies, Inc., Milpitas, CA (US)

(72) Inventors: Narasimhan Trichy, Plano, TX (US); Andrew Prosory, Queen Creek, AZ (US)

(73) Assignee: Sandisk Technologies, Inc., Milpitas, CA (US)

( * ) Notice: Subject to any disclaimer, the term of this patent is extended or adjusted under 35 U.S.C. 154(b) by 173 days.

(21) Appl. No.: 18/448,274

(22) Filed: Aug. 11, 2023

(65) Prior Publication Data

US 2024/0321373 A1 Sep. 26, 2024

Related U.S. Application Data

(60) Provisional application No. 63/491,796, filed on Mar. 23, 2023.

(51) Int. Cl.
*G11C 29/02* (2006.01)
*G01R 31/64* (2020.01)

(52) U.S. Cl.
CPC ............ *G11C 29/021* (2013.01); *G01R 31/64* (2020.01)

(58) Field of Classification Search
CPC .............................. G11C 29/021; G01R 31/64
See application file for complete search history.

(56) References Cited

U.S. PATENT DOCUMENTS

| | | | |
|---|---|---|---|
| 8,362,784 B2 | 1/2013 | Takeuchi | |
| 9,740,258 B2 | 8/2017 | Morning-Smith et al. | |
| 10,928,460 B2 | 2/2021 | Goto et al. | |
| 2003/0204776 A1 | 10/2003 | Testin | |
| 2012/0126735 A1 | 5/2012 | Ueda et al. | |
| 2021/0231720 A1 | 7/2021 | Butler et al. | |
| 2021/0351595 A1* | 11/2021 | Mocanu | G11C 5/141 |
| 2022/0122631 A1* | 4/2022 | Lucky | G01R 27/00 |
| 2024/0241161 A1* | 7/2024 | Lim | G01R 27/26 |
| 2024/0288480 A1* | 8/2024 | Redaelli | G01R 27/2688 |

FOREIGN PATENT DOCUMENTS

| | | |
|---|---|---|
| JP | 2017192180 A | 10/2017 |
| JP | 2017195009 A | 10/2017 |
| KR | 20220100330 A | 7/2022 |

* cited by examiner

*Primary Examiner* — Xiaochun L Chen
(74) *Attorney, Agent, or Firm* — Michael Best & Friedrich LLP

(57) ABSTRACT

A data storage device includes a non-volatile memory device, a capacitor bank, and a power regulator electrically coupled to the capacitor bank and configured to provide power to the non-volatile memory device. The data storage device further includes a controller configured to discharge the capacitor bank from a first voltage to a second voltage at a first constant current and determine a first discharge time, controller is further configured to discharge the capacitor bank from the first voltage to the second voltage at a second constant current and determine a second discharge time. A voltage holdup time of the capacitor bank is then determined based on at least the first discharge time and the second discharge time.

20 Claims, 7 Drawing Sheets

CAPACITOR HEALTH CHECK FOR DATA STORAGE DEVICES

CROSS-REFERENCE TO RELATED APPLICATION

This application claims priority to and the benefit of U.S. Provisional Patent Application No. 63/491,796, filed on Mar. 23, 2023, the entire contents of which is incorporated herein by reference.

FIELD

This application relates generally to data storage devices, and more particularly, to Power Loss Protections ("PLP") circuits and health check circuits and process for determining a health of holdup capacitors used in PLP and health check circuits within the data storage devices.

BACKGROUND

Data storage devices generally include one or more energy storage devices, such as capacitor banks, to ensure that power can be maintained for a period of time sufficient to complete any pending read or write operations before the data storage device powers down to reduce the chance of data corruption or loss occurring during a power loss or disruption. Health checks may be performed on the energy storage devices to determine an amount of energy stored within the energy storage devices, which in turn provides an indication of a time available, sometimes referred to as holdup time, to the data storage device in the event of a power loss.

Current health check circuits typically utilize one or more resistors to perform a controlled discharge of the storage capacitors to determine the holdup time based on a time constant of the capacitor bank and the time it takes to discharge the storage capacitor by a predefined amount (for a voltage difference of ΔV. These systems often require complex equations to account for inaccuracies in resistor values, leakage current of capacitors, etc. By attempting to account for these variable conditions using equations only, determinations of holdup time may be off by plus/minus ten percent.

These existing health check measurements are generally inaccurate due to leakage currents in the storage capacitors themselves, as well as due to time base (on chip clock) inaccuracies that affect clock time measurements, errors in measuring the absolute value of the discharge voltage ΔV, inaccuracy of the absolute value of the discharge currents used in health check process, and approximations in calculations using resistive discharge circuits that require exponential equations to be linearized and approximated. The technology disclosed herein uses current sources and ratiometric cancellation techniques to eliminate or minimize errors from these potential sources of errors in measurement used in health check circuits.

SUMMARY

Determination of health of a capacitor bank (or other energy storage device) of a data storage device is critical to ensure that sufficient energy is available to perform actions in the event of a loss of power from an external power supply. Utilizing a to step health check measurement process using two constant currents to discharge the capacitor bank during a health check operation can allow for increased accuracy in determining the health of the capacitor bank by cancelling out effects from leakage currents. Additionally, by using constant currents, linear calculations can be used to determine a holdup time. Additionally, using a single comparator to determine discharge times, as well as high speed, high accuracy timers, further improves accuracy and reduces errors present in current devices performing a capacitor bank health check operation. For example, accuracy of calculating a holdup time may be improved to have an error of less than plus/minus 3%.

One embodiment of the present disclosure includes a data storage device including a non-volatile memory device, a capacitor bank, and a power regulator electrically coupled to the capacitor bank and configured to provide power to the non-volatile memory device. The data storage device further includes a controller configured to control the power regulator to discharge the capacitor bank from a first voltage to a second voltage at a first constant current across a health check resistor and determine a first discharge time which is a time to discharge from the first voltage to the second voltage at the first constant current. The controller is further configured to control the power regulator to discharge the capacitor bank from the first voltage to the second voltage at a second constant current across the health check resistor and determine a second discharge time, which is a time to discharge from the first voltage to the second voltage at the second constant current. The health check operation is also configured to determine a voltage holdup time of the capacitor bank based on the first discharge time and the second discharge time.

Another embodiment of the present disclosure includes a method for determining a voltage holdup time of a data storage device holdup capacitor storage bank. The method includes controlling, with a controller, a power regulator to discharge the holdup capacitor storage bank from a first voltage to a second voltage across a health check resistor at a first constant current and determining, with the controller, a first discharge time that is a time to discharge from the first voltage to the second voltage. The method also includes controlling, with the controller, the power regulator to discharge the holdup capacitor storage bank from the first voltage to the second voltage across the health check resistor at a second constant current and determining a second time that is a time to discharge from the first voltage to the second voltage at the second constant current. The method further includes determining, with the controller, a voltage holdup time of the holdup capacitor storage bank based at least on the first discharge time and the second discharge time.

Another embodiment of the present disclosure includes a data storage device including a non-volatile memory device, a capacitor bank, and a power regulator electrically coupled to the capacitor bank and configured to provide power to the non-volatile memory device. The data storage device further includes a controller that interfaces with the power regulator to perform a health check operation. The health check operation is configured to increase a voltage of the capacitor bank to a first voltage, discharge the capacitor bank from the first voltage to a second voltage at a first constant current across a health check resistor and determine a first discharge time which is a time to discharge from a third voltage to the second voltage at the first constant current. The third voltage is less than the first voltage. The health check operation is further configured to increase the voltage of the capacitor bank to the first voltage, discharge the capacitor bank from the first voltage to the second voltage at a second constant current across the health check resistor and determine a second discharge time, which is a time to discharge from the third voltage to the second voltage at the second constant current. The health check operation is also configured to determine a voltage holdup time of the capacitor bank based at least on the first time and the second time.

Various aspects of the present disclosure provide for data storage devices with capacitive storage banks for supplying power during a loss or interruption in a power supply to prevent corruption or loss of customer data. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM ("Resistive Random Access Memory"), MRAM ("Magnetoresistive Random Access Memory"), DRAM ("Dynamic Random Access Memory"), etc.

Figure 1:
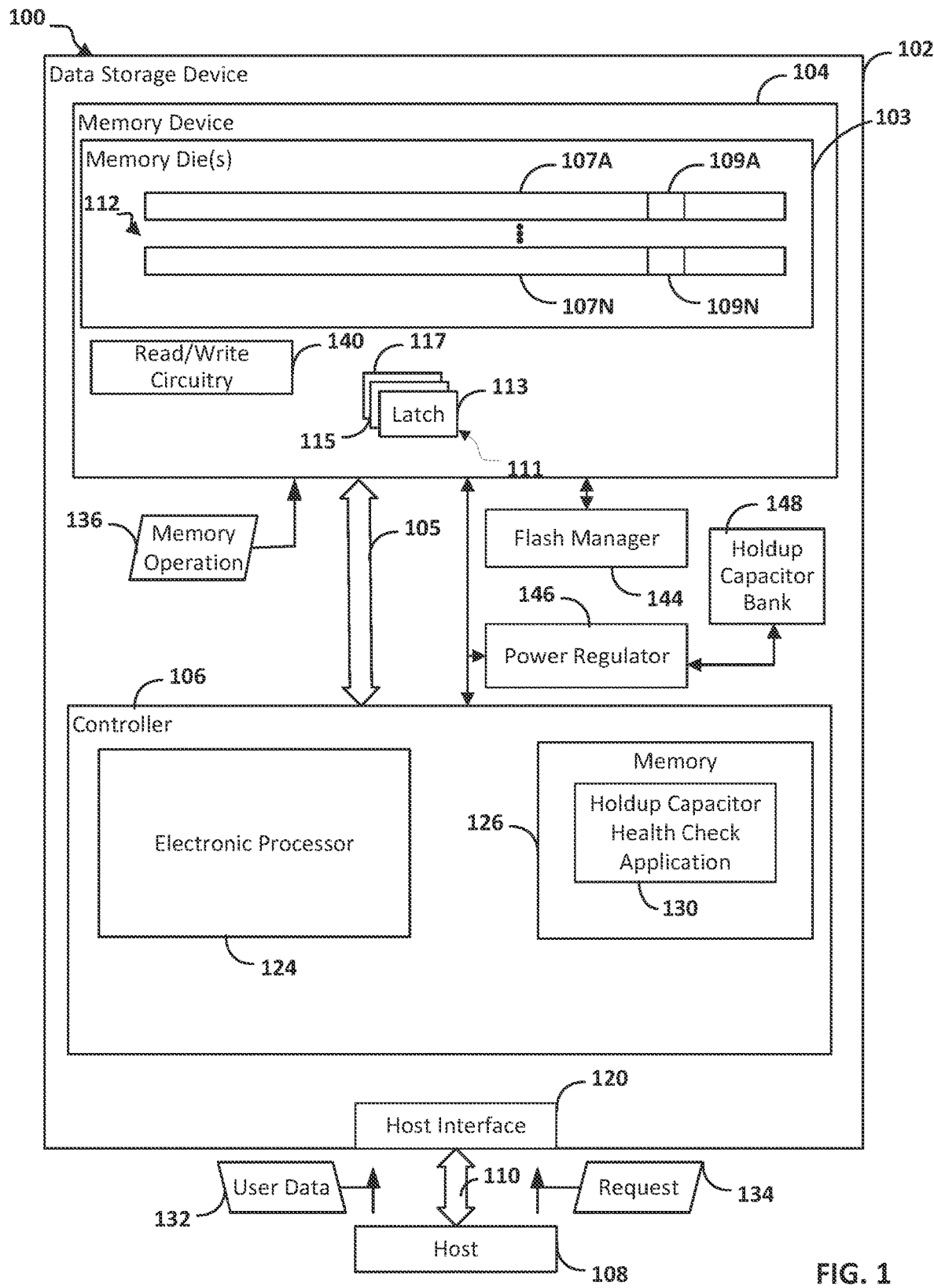
FIG. 1 is a block diagram illustrating one example of a system including a data storage device, according to some embodiments.

FIG. 1 is a block diagram of one example of a system 100 that includes holdup capacitor health check functionality, in accordance with some embodiments of the disclosure. In the example of FIG. 1, the system 100 includes a data storage device 102 in communication with a host device 108. The data storage device 102 includes one or more memory devices 104 (e.g., non-volatile memory) that is coupled to a controller 106.

One example of the structural and functional features provided by the controller 106 is illustrated in FIG. 1. However, the controller 106 is not limited to the structural and functional features provided by the controller 106 in FIG. 1. The controller 106 may include fewer or additional structural and functional features that are not illustrated in FIG. 1.

The data storage device 102 and the host device 108 may be operationally coupled through a connection (e.g., a communication path 110), such as a bus or a wireless connection. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to a solid-state drive (SSD), which may be used as an embedded storage drive (e.g., a mobile embedded storage drive), an enterprise storage drive (ESD), a client storage device, a cloud storage drive, or other suitable storage drives.

The data storage device 102 may be configured to be coupled to the host device 108 using the communication path 110, such as a wired communication path and/or a wireless communication path. For example, the data storage device 102 may include an interface 120 (e.g., a host interface) that enables communication using the communication path 110 between the data storage device 102 and the host device 108, such as when the interface 120 is communicatively coupled to the host device 108. In some examples, the host device 108 may provide power to the data storage device 102. For example, the host device 108 may provide one or more regulated voltages to the data storage device 102, such as 12 VDC, 5 VDC, 3.3 VDC, etc.

The host device 108 may include a processor and a memory. The memory may be configured to store data and/or instructions that may be executable by the processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to the memory device 104 of the data storage device 102. For example, the host device 108 may be configured to provide data, such as user data 132, to be stored at the memory device 104 or to request data to be read from the memory device 104. The host device 108 may include a mobile Smartphone, a music player, a video player, a gaming console, an electronic book reader, a personal digital assistant (PDA), a computer, such as a laptop computer or notebook computer, any combination thereof, or other suitable electronic device.

The host device 108 communicates using a memory interface that enables reading from the memory device 104 and writing to the memory device 104. In some examples, the host device 108 may operate in compliance with an industry specification, such as a Universal Flash Storage (UFS) Host Controller Interface specification. In other examples, the host device 108 may operate in compliance with one or more other specifications, such as a Secure Digital (SD) Host Controller specification or other suitable industry specification. The host device 108 may also communicate with the memory device 104 in accordance with any other suitable communication protocol.

The memory device 104 of the data storage device 102 may include a non-volatile memory (e.g., NAND, NOR, BiCS family of memories, or other suitable memory). In some examples, the memory device 104 may be any type of flash memory. For example, the memory device 104 may be two-dimensional (2D) memory or three-dimensional (3D) flash memory. The memory device 104 may include one or more memory dies 103. In some of the embodiments, individual memory dies 103 or groups of memory dies 103 may be referred to as arrays. Each of the one or more memory dies 103 may include one or more memory blocks 112 (e.g., one or more erase blocks). Each memory block 112 may include one or more groups of storage elements, such as a representative group of storage elements 107A-107N. The group of storage elements 107A-107N may be configured as a wordline. The group of storage elements 107A-107N may include multiple storage elements (e.g., memory cells that are referred to herein as a "string"), such as a representative storage elements 109A and 109N, respectively.

The memory device 104 may include support circuitry, such as read/write circuitry 140. Although depicted as a single component, the read/write circuitry 140 may be divided into separate components of the memory device 104, such as read circuitry and write circuitry. The read/write circuitry 140 may be external to the one or more memory dies 103 of the memory device 104. Alternatively, one or more individual memory dies 103 may include corresponding read/write circuitry 140 that is operable to read from and/or write to storage elements within the individual memory die, independent of any other read and/or write operations at any of the other memory dies. For example, the read/write circuitry 140 may be configured to perform various read/write operations such as initial writing to volatile memory, array commit functions, and other functions as required for a given application. The memory device 104 may further include one or more latches (e.g., a set of latches 111 including latches 113, 115, and 117).

The data storage device 102 may further include a flash manager 144 and one or more power regulators 146. The flash manager 144 may be configured to control one or more aspects of the memory devices 104. For example, the flash manager 144 may be configured to perform one or more data verification functions. In other examples, the flash manager 144 may perform data verification on all data read from and written to the memory devices 104. The flash manager 144 may further be configured to perform one or more error correction operations, such as cyclic redundancy check ("CRC"), to validate the contents of data processed by the read/write circuitry 140. In one embodiment, the flash manager 144 is further configured to control the operation of the one or more power regulators 146. For example, the flash manager 144 may be configured to switch the power regulators 146 between an ON state and an OFF state. In other examples, the flash manager 144 may be configured to control an output of the power regulators, such as a voltage level output, based on sensed or calculated parameters. While the flash manager 144 of FIG. 1 is shown as independent of the controller 106 and the one or more memory devices 104, in some embodiments, the flash manager 144 may be integrated into the controller 106 and/or the memory device 104. The flash manager 144 may further be configured to interface with the controller 106, the memory device 104, and/or the power regulator 146. For example, the flash manager 144 may communicate with the controller 106 and/or the one or more memory devices using a communication protocol, such as I2C or other suitable communication protocol.

In some examples, the one or more power regulators 146 are power management integrated circuits ("PMIC") and are configured to control power provided to the one or more memory devices 104. The one or more power regulators 146 may include or be configured to include a PMIC as well as other ancillary circuitry (e.g., external resistors, capacitors, or other components as required for a given application). For example, each of the one or more memory devices 104 may have an associated power regulator 146. In other examples, a single power regulator 146 may be configured to control power to multiple memory devices 104. In some embodiments, the one or more power regulators 146 are configured to transmit data to, and receive data from, the controller 106. In some embodiments the power regulators 146 may be coupled to one or more holdup capacitor banks 148. The holdup capacitor banks 148 are configured to provide sufficient power to complete a read or write operation in the event of a loss of external power to the data storage device 102 in order to reduce the chances for data corruption. The power regulators 146 will be described in more detail below.

The controller 106 is coupled to the memory device 104 (e.g., the one or more memory dies 103) using a bus 105, an interface (e.g., interface circuitry), another structure, or a combination thereof. For example, the bus 105 may include multiple distinct channels to enable the controller 106 to communicate with each of the one or more memory dies 103 in parallel with, and independently of, communication with the other memory dies 103.

The controller 106 is configured to receive data and instructions from the host device 108 and to send data to the host device 108. For example, the controller 106 may send data to the host device 108 using the interface 120, and the controller 106 may receive data from the host device 108 using the interface 120. The controller 106 is configured to send data and commands (e.g., the memory operation 136, which may be a cycle operation of a memory block of the memory device 104) to the memory device 104 and to receive data from the memory device 104. For example, the controller 106 is configured to send data and a program or write command to cause the memory device 104 to store data to a specified address of the memory device 104. The write command may specify a physical address of a portion of the memory device 104 (e.g., a physical address of a word line of the memory device 104) that is to store the data, as well as a size (e.g., 2$k$, 4$k$, etc.) of the data to be written.

The controller 106 is configured to send a read command to the memory device 104 to access data from a specified address of the memory device 104. The read command may specify the physical address of a region of the memory device 104 (e.g., a physical address of a word line of the memory device 104), as well as a size (e.g., 2$k$, 4$k$, etc.) of the data to be read. The controller 106 may also be configured to send data and commands to the memory device 104 associated with background scanning operations, garbage collection operations, and/or wear-leveling operations, or other suitable memory operations.

The controller 106 may include a processor 124, a memory 126, and other associated circuitry. The memory 126 may be configured to store data and/or instructions that may be executable by the processor 124. The memory 126 may include a holdup capacitor health check application 130 among other applications, programs, etc. The holdup capacitor health check application 130 may be a hardware circuit or instructions that are executable by the processor 124. While shown as being stored in the memory 126, in some examples the holdup capacitor health check application 130 may be configured as a circuit within the memory device 104.

The holdup capacitor health check application 130 may be configured to execute one or more operations to check or verify the health of the holdup capacitors within the data storage device 102. For example, the holdup capacitor health check application 130 may interface with the power regulators 146 to perform one or more health checks of the associated holdup capacitors as described in more detail below. For example, the holdup capacitor health check application 130 may initiate one or more holdup capacitor health check operations within the power regulators 146. In some embodiments, the holdup capacitor health check application 130 receives data associated with a holdup capacitor health check operation from the one or more power regulators 146. The holdup capacitor health check application 130 may then process the received data to determine a health of the holdup capacitors as will be described in more detail below. While shown as being stored within the memory 126, in some instances the holdup capacitor health check application 130 may be integrated within the flash manager 144.

Figure 2:
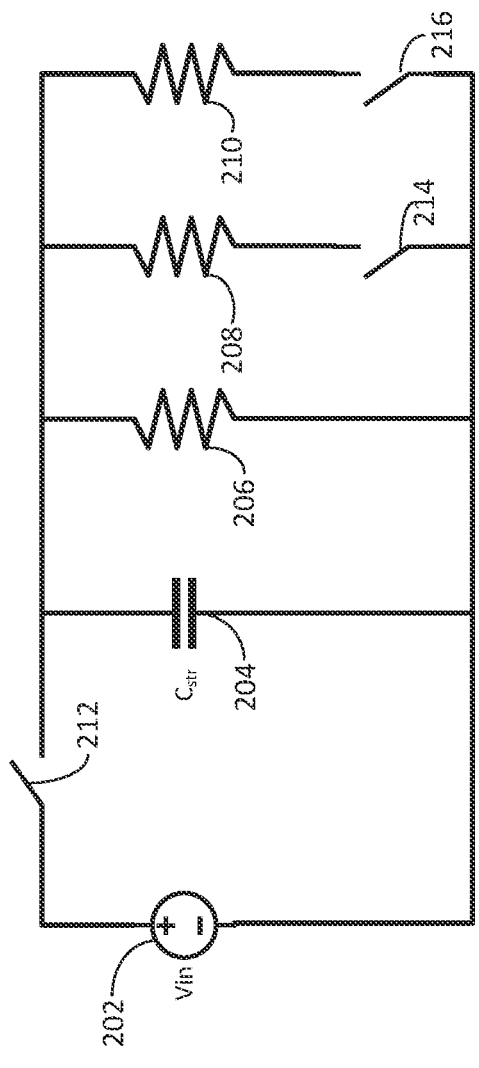
FIG. 2 is a circuit diagram of a known health check circuit, according to some embodiments.

Turning now to FIG. 2, a simplified circuit diagram illustrating a comparative circuit 200 for determining holdup capacitor health is shown, according to some embodiments. A power source 202 is arranged in parallel with a capacitor storage bank 204, an equivalent leakage resistor 206 (representing the leakage of the capacitor storage bank 204), a first health check resistor 208, and a second health check resistor 210. In some examples, the circuit 200 may be integrated into a power regulator, such as power regulator 146, described above. During normal operation, a first switch 212 may be closed to charge the capacitor storage bank 204 in a charging cycle. During the charging cycles, a second switch 214 and a third switch 216 are opened, such that no current flows through the first health check resistor 208 and the second health check resistor 210. This allows for the power source 202 to charge the capacitor storage bank 204.

When performing a health check operation, one or more discharge operations are performed using the circuit 200. For example, a first discharge operation may occur by opening the first switch 212 and closing the second switch 214 such that the capacitor storage bank 204 is discharged through the equivalent leakage resistor 206 and the first health check resistor 208. A voltage of the capacitor storage bank 204 is then monitored by a controller, such as controller 106 or power regulator 146. The voltage is monitored to determine whether the voltage drops below a predetermined threshold. For example, the predetermined threshold may be a 10% drop in voltage below a nominal voltage of the capacitor storage bank 204. However, values of more than 10% or less than 10% are also contemplated as required for a given application. In some embodiments, the predetermined threshold may be a predefined voltage difference, such as a 1V voltage difference. However, voltages of more than 1V or less than 1V are also contemplated. Upon the voltage falling below the nominal voltage of the capacitor storage bank 204, the first discharge operation is stopped by opening the second switch 214 and closing the first switch 212 to recharge the capacitor storage bank 204, as described above.

In response to the capacitor storage bank 204 being recharged, a second discharge operation may occur by opening the first switch 212 and closing the second switch 214 such that the capacitor storage bank 204 is discharged through the equivalent leakage resistor 206 and the second health check resistor 208. In one embodiment, the second health check resistor 210 has a different impedance than the first health check resistor 208. The voltage of the capacitor storage bank 204 is then monitored by a controller, such as controller 106 or power regulator 146. The voltage is monitored to determine whether the voltage drops below a predetermined threshold voltage. For example, the predetermined threshold may be a 10% drop in voltage below the nominal voltage of the capacitor storage bank 204. However, values of more than 10% or less than 10% are also contemplated as required for a given application. In some embodiments, the predetermined threshold may be a predefined voltage difference, such as a 1V voltage difference. However, voltages of more than 1V or less than 1V are also contemplated. Upon the voltage falling below the nominal voltage of the capacitor storage bank 204, the first discharge operation is stopped by opening the second switch 214 and closing the first switch 212 to recharge the capacitor storage bank 204, as described above. In some examples, additional discharge operations may be performed, such as using other combinations of the first health check resistor 208 and the second health check resistor 210 or using additional health check resistors.

In response to completing the second (or final) discharge operation, a discharge time of the first discharge operation is determined using the calculation $$T_1 = R_1 * C * \ln\left(\frac{V_1}{V_2}\right).$$

A discharge time of the second discharge operation is then determined using the calculation $$T_2 = R_2 * C * \ln\left(\frac{V_1}{V_2}\right).$$

In the above equations, C is equal to the capacitor storage bank 204 capacitance, $V_1$ is equal to the nominal voltage and $V_2$ is equal to the predetermined threshold voltage. $R_1$, $R_2$, and C are known values. The capacitor storage bank 204 does experience leakage due to the imperfect nature of the associated capacitors. Thus, a value of the leakage resistance must be calculated to determine the actual health of the storage capacitors to determine subsequent leakage current. The leakage resistance is determined using expression (1).

$$R_L = \left(R_2 * \left(\frac{T_1}{T_2} - 1\right)\right) / \left(1 - \frac{T_1 * R_2}{T_2 * R_2}\right) \quad (1)$$

Upon determining the leakage resistance, a leakage current (IL) may be determined using the expression (2).

$$I_L = \frac{V_c}{R_L} \quad (2)$$

In expression (2), $V_c$ is equal to the voltage of the capacitor storage bank 204.

While the above circuit 200 and subsequent equations, the low discharge current (e.g., 10 mA) and the variation in the one or more health check resistors 208, 210 can result in the health of the capacitor storage bank 204 being only able to be determined with approximately 10% accuracy. Further, the leakage current of the capacitor storage bank 204 during the health check operation is not significant in comparison to a back-up operation when the load current is many times higher than the health check discharge current. Furthermore, the circuit 200, through its use of varying resistances in the health check operations, requires exponential calculations to determine the discharge times and/or leakage resistance, which requires additional time and computing power to perform.

Figure 3:
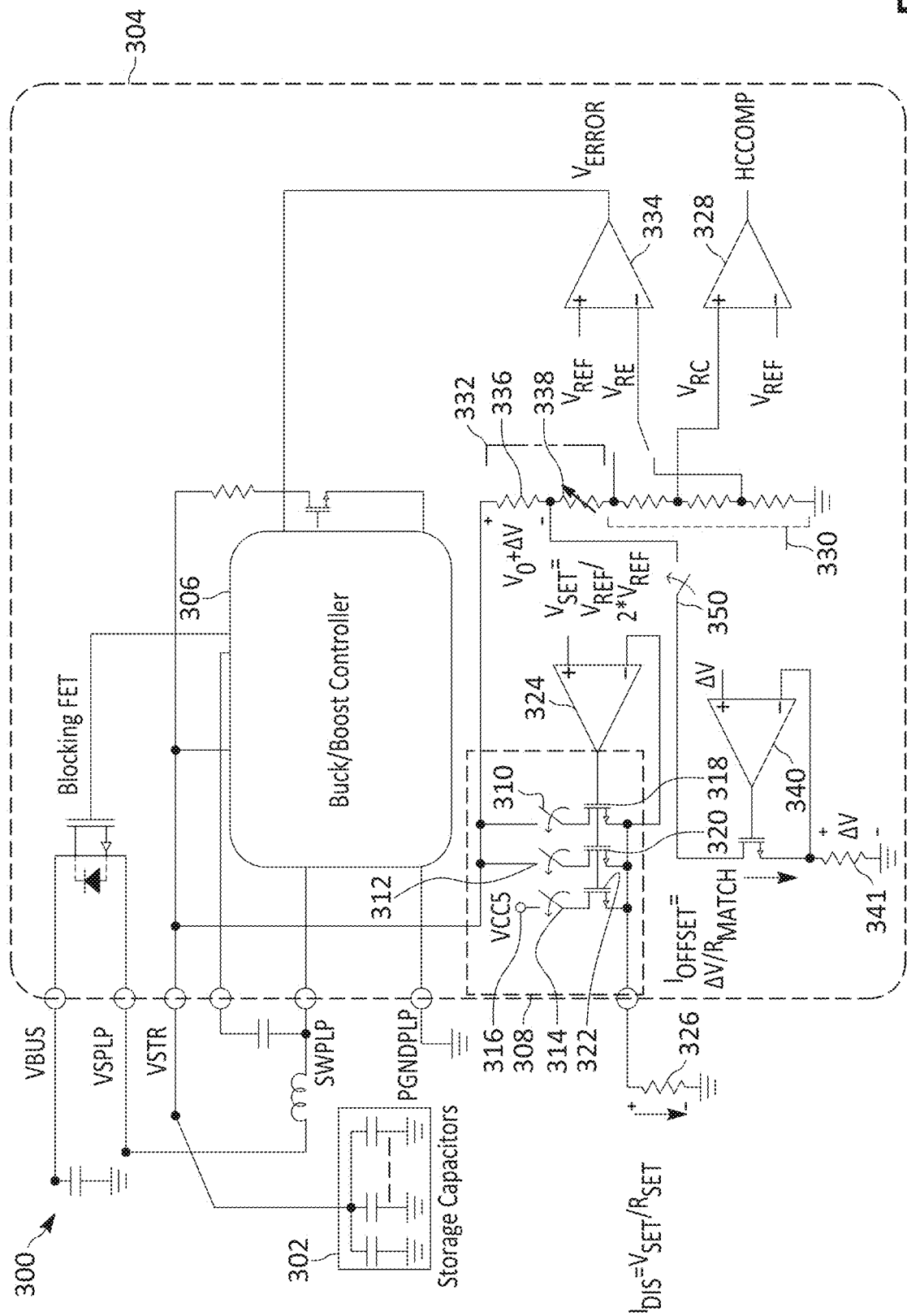
FIG. 3 is circuit diagram illustrating a constant current health check circuit, according to some embodiments.

Turning now to FIG. 3, a constant current health check circuit 300 is shown according to one embodiment. The constant current health check circuit 300 is configured to discharge a capacitor storage bank 302 using a constant current, which allows for a more precise measurement of the health of the capacitor storage bank 302, as will be described in more detail below. The capacitor storage bank 302 is coupled to a power regulator 304. The power regulator 304 may be similar to the power regulator 146 described above. As described above, the power regulator 304 may be a PMIC. The power regulator 304 may include a buck/boost controller 306 configured to control a voltage level of the capacitor storage bank 302. The power regulator further includes a discharge circuit 308, which includes a first discharge switch 310 and a second discharge switch 312 coupled to an output of the capacitor storage bank 302. A third discharge switch 314 may be coupled to a fixed voltage output 316. The first discharge switch 310 is in series with a first discharge current driver 318, the second discharge switch 312 is in series with a second discharge current driver 320, and the third discharge switch 314 is in series with a third discharge current driver 322. The discharge current drivers 318, 320, 322 are controlled by amplifier 324. The amplifier 324 is configured to control the discharge current drivers 318, 320, 322 to drive a constant current into a health check resistor 326. The health check resistor 326 may be a high precision resistor (e.g., 1% resistor). By controlling the discharge current drivers 318, 320, 322 to provide a constant discharge current, the current may be evaluated as a constant in calculations used to determine a holdup time, as described in more detail below. While described in detail in FIG. 3, it is understood that the storage capacitor bank 302 may be charged by various types of boost circuits having various implementations, and the above circuitry described herein is exemplary in nature and is not limiting.

A health check comparator 328 is coupled to an output of the storage capacitors and is configured to switch an output as the output voltage of the capacitor storage bank 302 transitions between predetermined values. In some examples, the output of the health check comparator 328 may be configured to provide an output to a controller, such as the controller 106 described above. A first input of the health check comparator 328 is connected to a portion of a first voltage divider network 330 which regulates the output voltage of the buck/boost controller 306 used to set the output voltage of the capacitor storage bank 302. The second input of the health check comparator 328 is connected to a reference voltage to set a threshold voltage for the health check comparator.

A second voltage divider network 332 is coupled to a feedback driver 334 which is configured to provide an error signal to the buck/boost controller 306. The error signal is generated based on the voltage output of the capacitor storage bank 302 and is used to ensure proper regulation of the capacitors within the capacitor storage bank 302. The second voltage divider network 332 may include a first matching resistor 336 in series with a variable resistor 338. The variable resistor 338 may be tuned to set a voltage of the capacitor storage bank 302. In some examples, the first voltage divider network 330 and the second voltage divider network 332 are arranged in series to create a single voltage divider network.

A matching amplifier 340 drives an output current into a second match resistor 341. The second match resistor 341 and the first match resistor 336 are measured such that a ratio between the resistances is known, thereby allowing for a desired voltage differential ($\Delta V$) to be accurately maintained. For example, the current set by the output current driven by matching amplifier 340 increases the voltage drop across the first match resistor 336 equal to the $\Delta V$ value. Any difference in the voltage dropped across second match resistor 341 is provided to an input of the matching amplifier which then is then configured to drive the output to eliminate any variation, thus ensuring a constant $\Delta V$ value being output. As the $\Delta V$ value is used as a constant in determining holdup time as described below, it is critical to ensure the $\Delta V$ value is held to a constant value to reduce any errors in determining holdup time. The $\Delta V$ value is used to determine a discharge time for the capacitor storage bank 302, as will be described in more detail below. By making the $\Delta V$ value a function of $V_{REF}*R341/R338$, $\Delta V$ can be made accurate to ~1% just like $V_{REF}$.

The above-described circuit 300 is configured to use a constant current to discharge capacitor storage bank 302 during a health check operation. This allows for linear equations to be used to determine the health of the capacitor storage bank 302 to improve both accuracy and processing requirements with respect to the health determination of the capacitor storage bank 302.

Figure 4A:
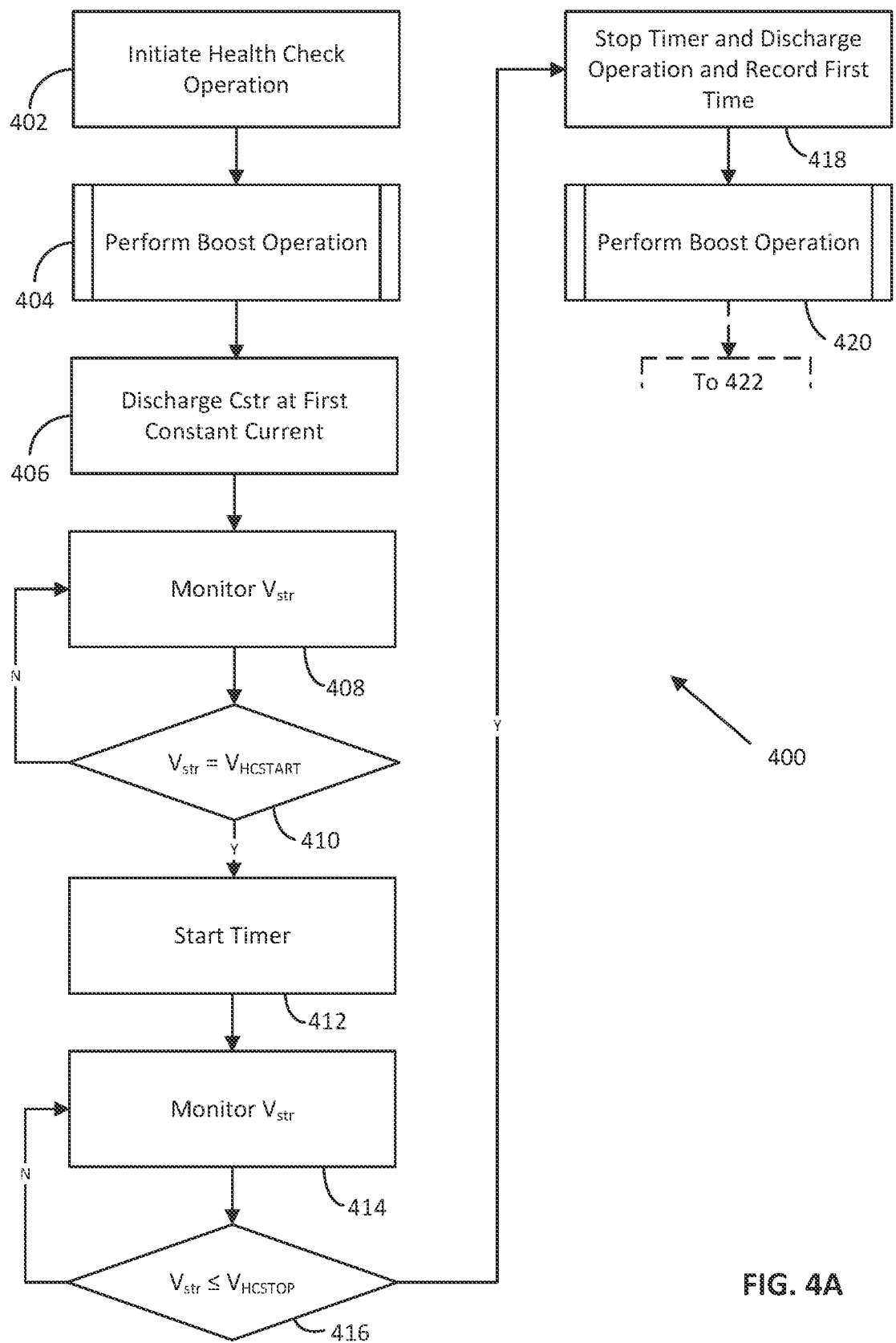
FIGS. 4A-4B is a flow chart illustrating a constant current health check operation, according to some embodiments.
Figure 4B:
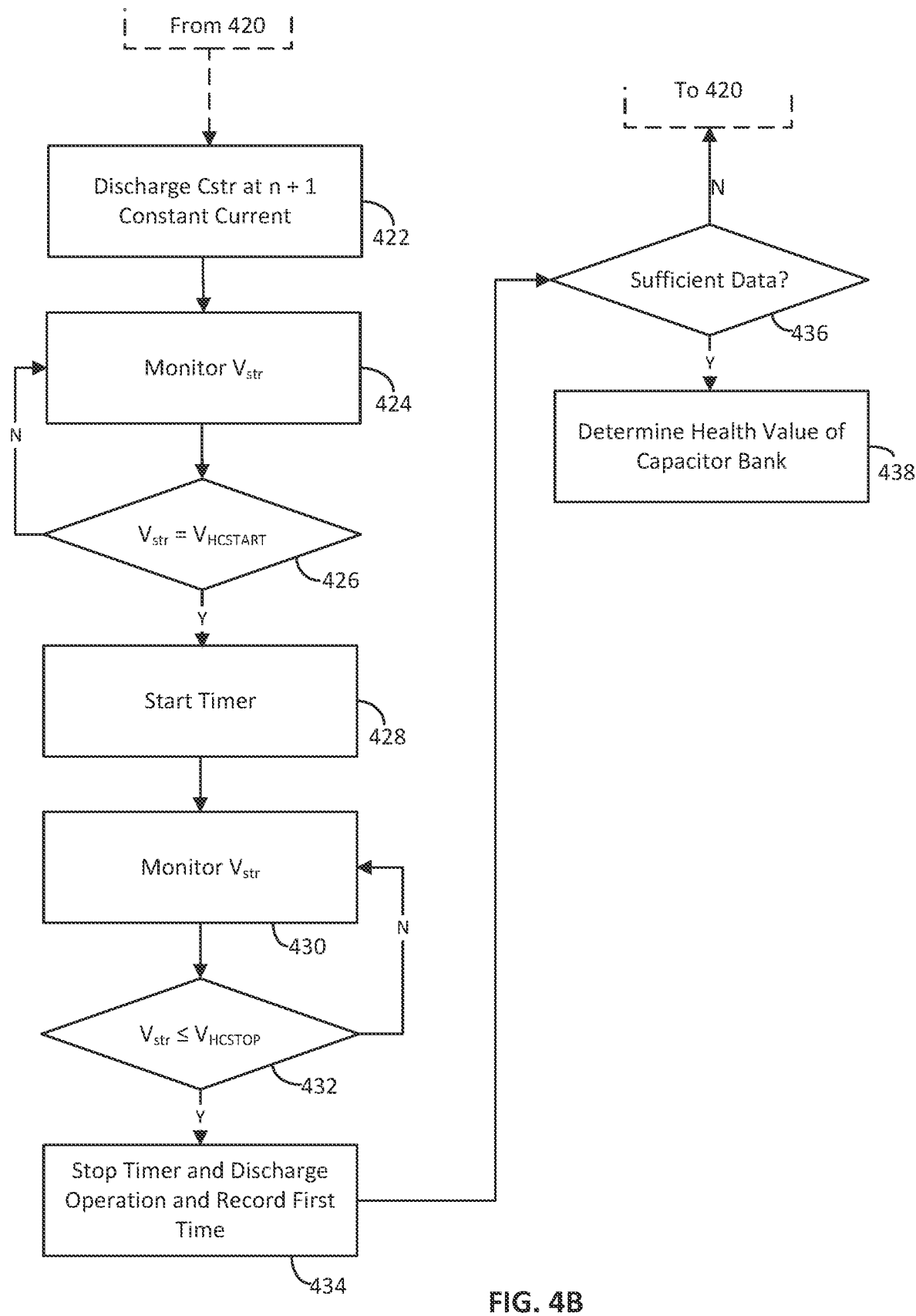

Turning now to FIGS. 4A-4B, a process 400 for performing a health check operation is shown, according to some embodiments. For example purposes, the process 400 is described as being performed with respect to the circuit 300 described above. In other examples, the process 400 may be described as being performed with respect to the circuit 300 and/or the data storage device 102 of FIG. 1. At process block 402, a health check operation is initiated. In some examples, a controller, such as controller 106, may initiate the health check operation. In other examples, a power regulator, such as power regulator 146, initiates the health check operation. In response to initiating the health check operation, a boost operation is performed at process block 404.

Figure 5:
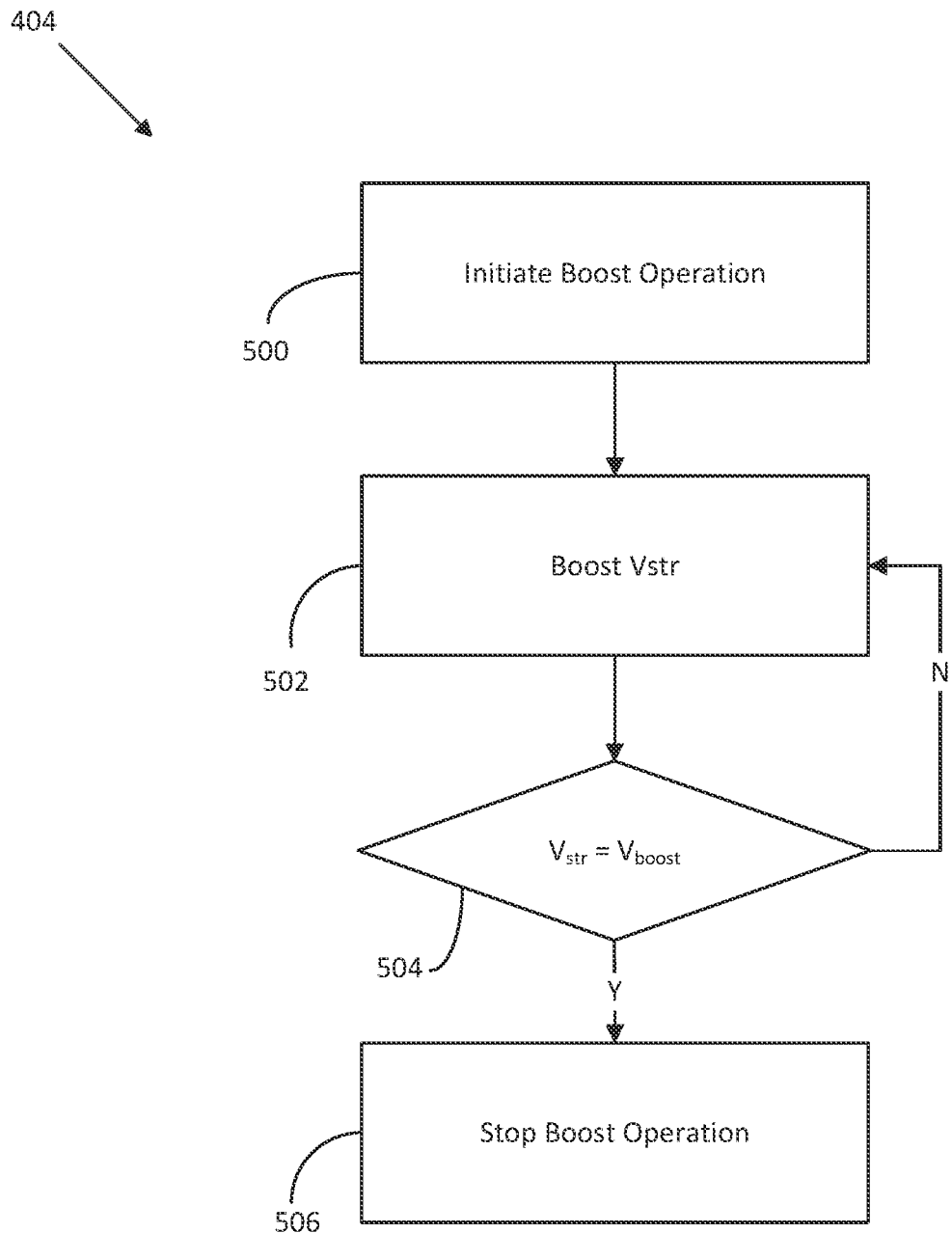
FIG. 5 is a flow chart illustrating a boost operation process, according to some embodiments.
Figure 6:
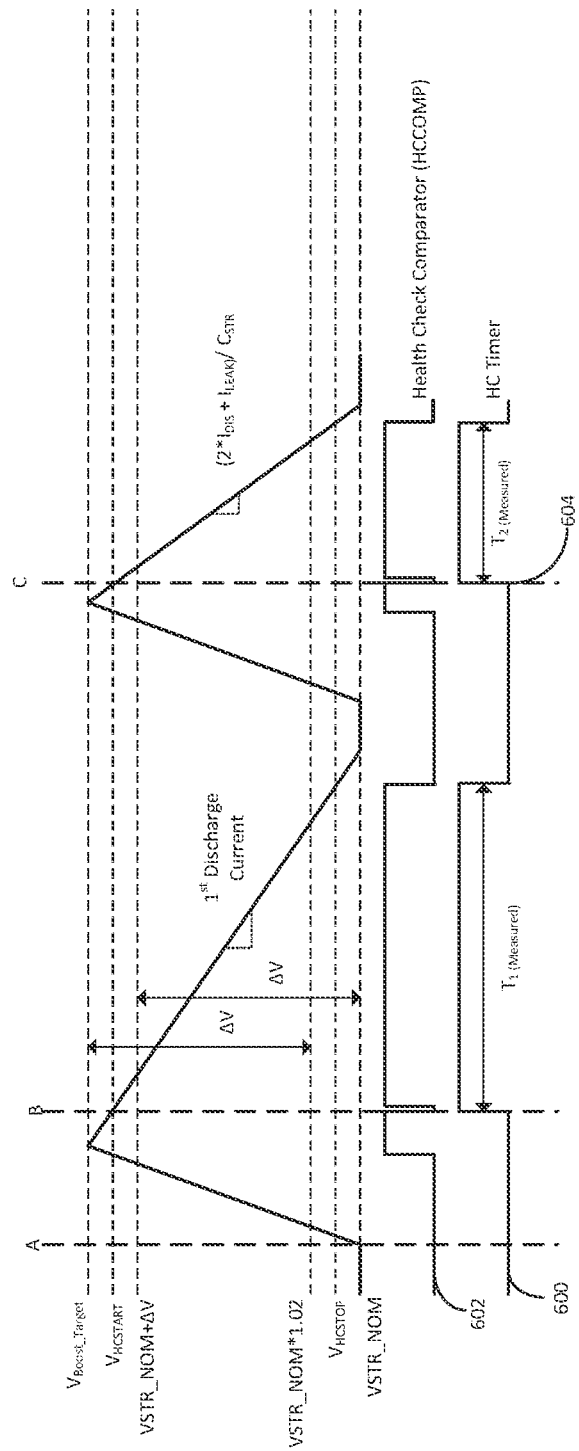
FIG. 6 is a data plot illustrating a constant current health check operation, according to some embodiments.

Turning now to FIG. 5, a boost operation process 500 is described, according to some embodiments. The boost operation is initiated at process block 502, as described above. At process block 504, the voltage of a capacitor storage bank ($V_{str}$), such as capacitor storage bank 302, is boosted to a target voltage above a nominal voltage ($V_{STR-NOM}$). In one embodiment, a buck/boost controller, such as buck/boost controller 306 is configured to boost the $V_{str}$. Turning briefly to FIG. 6, the initiation of the voltage boost is shown at time A. The target voltage (V Boost Target) may be equal to a value 2% above $V_{STR-NOM}$ plus a predetermined voltage differential ($\Delta V$). However, values of more than 2% or less than 2% are also contemplated as required for a given application. In some examples, $\Delta V$ is one volt. However, values of more than one volt or less than one volt are also contemplated. By increasing the boosted voltage by a percentage in addition to $\Delta V$, it can be ensured that the voltage of the capacitor storage bank does not fall below $V_{STR-NOM}$ during the health check process. This ensures that in the event that a power failure were to occur during the health check process 400, that the stored energy in the capacitor storage bank would not fall below $V_{STR-NOM}$, potentially reducing the ability of the associated data storage device 102 to complete one or more required operations.

Returning now to FIG. 5, at process block 506, the power regulator determines whether the boosted $V_{str}$ equals $V_{Boost}$ Target. In some embodiments, a feedback driver, such as feedback driver 334 described above may determine whether the boosted $V_{str}$ equals $V_{Boost}$ Target. However, in other examples, other circuitry within the power regulator 304 may determine whether the boosted $V_{str}$ equals $V_{Boost}$ Target. In response to $V_{str}$ being determined to not equal $V_{Boost}$ Target, the $V_{str}$ continues to be boosted at process block 502. In response to determining that $V_{str}$ is equal to $V_{Boost}$ Target, the boost operation is stopped at process block 508.

Returning now to FIG. 4, at process block 406 the capacitor storage bank 302 is discharged at a first constant current. In one embodiment, the first constant current may be 10 mA. However, values of more than 10 mA or less than 10 mA are also contemplated as required for a given application. In some embodiments, the capacitor storage bank 302 is discharged at the first constant current by one or more of discharge switches 310, 312 being closed to allow current to flow from the capacitor storage bank 302 and through the health check resistor 326. In some examples, the amplifier 324 is configured to control the discharge current by controlling one or more of the discharge current drivers 318, 320, 322. For example, as shown in FIG. 3, the amplifier 324 receives feedback equal to a voltage on the line side of the health check resistor 326. As the value of the health check resistor 326 is known, the amplifier 324 drives the discharge current drivers 318, 320, 322 to maintain the voltage at a Vset value. In one embodiment, the Vset value may be equal to $V_{ref}/(2*V_{ref})$, where $V_{ref}$ is equal to the voltage drop across health check resistor 326. However, in other embodiments, Vset may be any predetermined value as required for a given application. By maintaining $V_{set}$ at a constant voltage, the current through the health check resistor 326 is constant. The $I_{DIS}$ current through the resistor 326 in the above circuit is accurate as the $V_{SET}$ value can be regulated typically to an accuracy of ~1%. Furthermore, by ensuring that the health check resistor 326 is accurate to 1% or better, the $I_{DIS}$ may further be accurate to 1% error of less.

At process block 408, the $V_{str}$ of the capacitor storage bank 302 is monitored. In one embodiment, the power regulator 304 monitors the $V_{str}$ upon the capacitor storage bank 302 being discharged at process block 406. While the above embodiment described the power regulator 304 as monitoring the $V_{st}$ of the capacitor storage bank 302, it is understood that other components internal or external to the power regulator 304, such as controller 106, may monitor the $V_{st}$ as required for a given application. At process block 410, the power regulator determines whether the $V_{str}$ is equal to a start voltage, $V_{HCSTART}$. $V_{HCSTART}$ may be equal to a value 1% above $V_{STR-NOM}$ plus a desired ΔV. However, values of more than 1% or less than 1% are also contemplated. However, $V_{HCSTART}$ is understood to be a value less than $V_{Boost\ Target}$ to prevent or reduce a chance for distortion of discharge measurements due to variations (e.g., possible overshoots) in $V_{Boost\ Target}$.

In response to determining that $V_{str}$ is not equal to $V_{HCSTART}$, $V_{str}$ continues to be monitored at process block 408. In response to determining that $V_{str}$ is equal to $V_{HCSTART}$, a timer is started at process block 412. Turning briefly again to FIG. 6, the $V_{str}$ is shown as being discharged to $V_{HCSTART}$ at time B, at which point a timer signal 600 is initiated. The timer signal 600 may be tied to a comparator output 602, such as health check comparator 328, such that when the output of the health check comparator is high, the timer is measuring a time period. In other examples, the timer signal 600 may be tied to both a comparator output, as well as a second input such as an $I_{offset}$ circuit being removed from the circuit, such as by a switch, such as switch 350 being opened. In one embodiment, the timer is a separate circuit from the power regulator, such as a timer within the controller 106. As the controller 106 has higher speed and/or more accurate timers and clocks than those on a power regulator, a higher degree of precision may be gained by using the controller to perform any timing functions associated with the health check operation. However, in other examples, the power regulator 304 may include a high precision clock which may be used to measure the various time periods associated with the discharge cycles. By utilizing a high precision (e.g., less than 0.1 ppm) clock, additional accuracy is achieved as opposed to a lower precision clock which may introduce additional variation in all measured and calculated values.

At process block 414, the $V_{str}$ continues to be monitored as described above. At process block 416 the power regulator determines whether $V_{str}$ is less than or equal to a $V_{HCSTOP}$ value. The $V_{HCSTOP}$ value may be equal to $V_{STR-NOM}*1.01$, and is also a value higher than $V_{STR\ NOM}$. Thus, $V_{HCSTOP}$ is equal to the nominal $V_{st}$ value plus 1%. However, values of more than 1% or less than 1% are also contemplated. In simplified terms, the $V_{HCSTOP}$ value is equal to $V_{HCSTART}$—the desired ΔV. In response to determining that $V_{str}$ is not less than or equal to $V_{HCSTOP}$, $V_{str}$ continues to be monitored at process block 414. In response to determining that $V_{str}$ is less than or equal to $V_{HCSTOP}$, the discharge operation and timer are stopped and a first time $T_1$ is recorded at process block 418. In one embodiment, $T_1$ is stored in the memory 126. However, in other examples, $T_1$ may be stored in circuitry of the power regulator 304. It is understood that by using the same comparator, such as comparator 328, to trigger the timer to determine the time for $V_{STR}$ dropping below $V_{HCSTART}$, the offset voltage of the comparator is cancelled and therefore does not affect the ΔV value ($V_{HCSTART}+V_{OFFSET}$ is start point and $V_{HCSTOP}+V_{OFFSET}$ is stopping point and the difference between the two is still exactly ΔV while VOFFSET term is cancelled out in the subtraction).

At process block 420, a boost operation is again performed. The boost operation performed at process block 420 is understood to be the same as the boost operation process 500 described above. At process block 422, the capacitor storage bank 302 is discharged at an n+1 constant current value. The n+1 constant current value is generally greater than the first constant current value and is generally a set ratio with respect to the first constant current value. For example, the n+1 (at n=1) constant current value may be two times the first constant current value. Subsequent n+1 values may be increased factors of the first constant current value, such as four times the constant current value, eight times the constant current value, etc. It is understood that the above examples are for exemplary purposes only, and that various ratios and values of n+1 current values are contemplated for a given application. The value of n+1=2 is especially convenient for simple mathematical operations on measured time values $T_1$ (using $I_{DIS}$) and T2 (using $2\times I_{DIS}$) for accurate estimation of the energy available or the time to discharge the $V_{STR}$ voltage completely. The real discharge event during power loss back-up occurs with a high discharge rate where the self-leakage current of the capacitor storage bank 302 is a small value compared to the large system load that uses energy form $C_{STR}$ and discharges $V_{STR}$. However, during a health check operation, small values of discharge currents are used, such as 5 mA or 10 mA, and the self-discharge of the storage capacitor bank 302 can be a large fraction of the discharge current that also discharges $V_{STR}$ during health checking process and thereby increasing inaccuracies in the results. Cancelling the error in health check measurements with the two-step process as described herein improves the accuracy of the health check result. For example, using $I_{DIS}$ first to estimate the time of discharge ($T_1$) and then using twice the value of the discharge current ($2*I_{Dis}$) to get a second discharge timer value $T_2$ is especially useful for error cancellation with minimal mathematical calculations.

In some embodiments, the capacitor storage bank 302 is discharged at the n+1 current by one or more of discharge switches 310, 312 being closed to allow current to flow from the capacitor storage bank 302 and through the health check resistor 326. In some examples, the amplifier 324 is configured to control the discharge current by controlling one or more of the discharge current drivers 318, 320, 322. For example, as shown in FIG. 3, the amplifier 324 receives feedback equal to a voltage on the line side of the health check resistor 326. As the value of the health check resistor 326 is known, the amplifier 324 drives the discharge current drivers 318, 320, 322 to maintain the voltage at a Vset value. In one embodiment, the Vset value may be equal to $V_{ref}/(2*V_{ref})$, where $V_{ref}$ is equal to the voltage drop across health check resistor 326. However, in other embodiments, Vset may be any predetermined value as required for a given application. By maintaining $V_{set}$ at a constant voltage, the current through the health check resistor 326 is constant.

At process block 424, the $V_{str}$ of the capacitor storage bank 302 is monitored. In one embodiment, the power regulator 304 monitors the $V_{str}$ upon the capacitor storage bank 302 being discharged at process block 422. While the above embodiment described the power regulator 304 as monitoring the $V_{st}$ of the capacitor storage bank 302, it is understood that other components internal or external to the power regulator 304, such as controller 106, may monitor the $V_{str}$ as required for a given application. At process block 426, the power regulator determines whether the $V_{str}$ is equal to a start voltage, $V_{HCSTART}$. $V_{HCSTART}$ may be equal to a value 1% above $V_{STR-NOM}$ plus a desired $\Delta V$. However, values of more than 1% or less than 1% are also contemplated and measurement or monitoring can be done in several ways, such as a comparator or the controller 106 using an analog-to-digital converter ("ADC") for voltage measurements. However, $V_{HCSTART}$ is understood to be a value less than $V_{Boost\ Target}$ to prevent or reduce chance for distortion of discharge measurements due to variations (e.g., possible overshoots) in $V_{Boost\ Target}$.

In response to determining that $V_{str}$ is not equal to $V_{HCSTART}$, $V_{str}$ continues to be monitored at process block 408. In response to determining that $V_{str}$ is equal to $V_{HCSTART}$, a start time is recorded at process block 428. Turning briefly again to FIG. 6, the $V_{str}$ is shown as being discharged to $V_{HCSTART}$ at time C, during the n+1 discharge rate at which point a timer signal 604 is initiated. The timer signal 604 may be tied to a comparator output 602, such as health check comparator 328, such that when the output of the health check comparator is high, the timer is measuring a time period. In other examples, the timer signal 604 may be tied to both a comparator output, as well as a second input such as an $I_{offset}$ circuit being removed from the circuit, such as by a switch, such as switch 350 being opened. In one embodiment, the timer is a separate circuit from the power regulator 304, such as a timer within the controller 106. As the controller 106 has higher speed and/or more accurate timers and clocks than those on a power regulator, a higher degree of precision may be gained by using the controller to perform any timing functions associated with the health check operation. As noted above, using the same comparator (e.g., comparator 328) to check both the start and stop voltages of the discharge on $V_{STR}$ helps in offset cancellation.

Returning now to FIG. 4, at process block 430, the $V_{str}$ continues to be monitored as described above. At process block 432 the power regulator determines whether $V_{str}$ is less than or equal to a $V_{HCSTOP}$ value. The $V_{HCSTOP}$ value may be equal to $V_{STR-NOM}*1.01$. Thus, $V_{HCSTOP}$ is equal to the nominal $V_{str}$ value plus 1%. However, values of more than 1% or less than 1% are also contemplated. In simplified terms, the $V_{HCSTOP}$ value is equal to $V_{HCSTART}$—the desired $\Delta V$. In response to determining that $V_{str}$ is not less than or equal to $V_{HCSTOP}$, $V_{str}$ continues to be monitored at process block 430. In response to determining that $V_{str}$ is less than or equal to $V_{HCSTOP}$, the discharge operation and timer are stopped and a second time $T_2$ is recorded at process block 434. In one embodiment, $T_2$ is stored in the memory 126. However, in other examples, $T_2$ may be stored in circuitry of the power regulator 304. As the n+1 constant current is greater than the first constant current, it is expected that $T_2$ is less than $T_1$. For example, turning again to FIG. 6, it can be seen that the measured $T_2$ value is approximately one half the time of the measured $T_1$ value, where the n+1 constant current is twice the first constant current. As noted above, using a single comparator (e.g., comparator 328) to verify the start of the discharge timer when $V_{STR}<V_{HCSTART}$ and using the same comparator to verify when $V_{STR}<V_{HCSTOP}$, helps in cancelling offsets of the comparator in the measurements.

At process block 436, the controller 106 determines whether there is sufficient data to determine the health check of the capacitor storage bank 302. In some examples, the determination of sufficient data is pre-programmed such that a certain number of n+1 discharge cycles are required. However, in other examples, one or more functions or calculation may be performed, for example by execution of the holdup capacitor health check application 130, to determine whether more data (e.g., discharge cycles) are required to complete the operation. In response to determining that there is not sufficient data to determine the health of the capacitor storage bank 302, the process 400 returns to process block 420. In response to determining that there is sufficient data to determine the health of the capacitor storage bank 302, a health value of the capacitor storage bank 302 is determined at process block 438.

Generally, a two-step process is all that is required to mathematically calculate the magnitude of energy stored and the time it would take to deplete the stored energy on the storage capacitor during backup process. The main objective of the health check circuit is to estimate the duration of time available where the stored backup energy can support the system as a power source, giving time for the storage device to backup any necessary data. This estimation during health check uses a small discharge current where the self-discharge or leakage currents of the capacitor can corrupt the measurements as they are significant compared to the discharge currents used. By using a two-step process, the errors from unknown capacitor leakage current, comparator offsets, measuring the amount of discharge ($\Delta V$) and time measurement errors from an inaccurate clock base can be all cancelled out adequately to arrive at a result that is far more accurate than conventional measurement techniques used otherwise.

Determining the health value may be performed by the controller 106, such as using the holdup capacitor health check application 130. The below described equations and other calculations assume that two discharge cycles are performed using the process 400. However, it is contemplated that more than two discharge cycles may be performed as required for a given application. First, the current through the capacitor storage bank 302 during the first constant current discharge operation is determined using expression 3:

$$I_1 = C*(\Delta V/\Delta T_1) \quad (3)$$

With respect to expression (3), $I_1$ is the current through the capacitor storage bank 302 during the first constant current discharge operation added to any self-discharge currents that already exist in the form of capacitor leakage currents, C is the capacitance of the capacitor storage bank 302, and $\Delta T_1$ is the difference in time between the start of the discharge and the voltage reaching the $V_{HCSTOP}$ value. $\Delta V$ is the predetermined voltage differential described above. The current through the capacitor storage bank 302 during the n+1 constant current discharge operation is determined using expression (4).

$$I_2 = C*(\Delta V/\Delta T_2) \quad (4)$$

With respect to expression (4), $I_2$ is the current through the capacitor storage bank 302 during the second constant current discharge operation, C is the capacitance of the capacitor storage bank 302, and $\Delta T_2$ is the difference in time between the start of the discharge and the voltage reaching the $V_{HCSTOP}$ value. $\Delta V$ is the predetermined voltage differential described above. While not shown, subsequent current values (e.g., $I_{n+1}$) may be determined using similar equations. The deltas may then be eliminated to provide the ratio of $$\frac{I_1}{I_2} = \frac{T_2}{T_1}.$$

As the capacitor storage bank 302 has leakage current, the load (e.g., the health check resistor 326) has an equivalent load IL in parallel, such that $I_1$ is actually equal to $I_1+I_L$, and $I_2$ is actually equal to $I_2+I_L$. This can be used in the above ratio, such that the ratio of currents to time can be expressed as $(I_1+I_L)/(I_2+I_L)=T_2/T_1$. As the leakage current is generally expected to be constant regardless of the current used in each discharge cycle (either $I_1$ or $I_2$), by using more than one discharge cycle, as described above, along with a ratio of the currents, the leakage current can be easily measured to reduce and/or eliminate the effect of leakage current on the determination of the health value of the capacitor storage bank 302.

For example, assuming that $\Delta V$ is constant for each discharge cycle, and that the second discharge cycle uses a constant current value that is twice that of the first constant current used in the first discharge cycle, the first discharge current applied to the capacitor storage bank 302 may be represented as $I_{DIs}$ and the second discharge current applied to the capacitor storage bank 302 in the second step may be represented by $2*I_{DIs}$. Thus, using the equation of $(\Delta T_1/\Delta T_2)=(2*I_{DIS}+I_L)/(I_{DIS}+I_L)=1+(I_{DIS})/(I_{DIS}+I_L)$, mathematical manipulation results in an equation for determining $I_L$, shown in expression (5):

$$I_L = I_{DIS}*(2*\Delta T_2 - \Delta T_1)/(\Delta T_1 - \Delta T_2) \quad (5)$$

Using expression (5) to express $I_L$ in the equation $C=(I_{DIS}+I_L)*\Delta T_1/\Delta V$, we get $C*\Delta V=I_{DIS}*\Delta T_1*(1+(2*\Delta T_2-\Delta T_1)/(\Delta T_1-\Delta T_2))$, which may be further simplified to $C*\Delta V/I_{DIS}=\Delta T_1*\Delta T_2/(\Delta T_1-\Delta T_2)$. Then, assuming that the health check value $\Delta T$ is equal to $\Delta T_1*\Delta T_2/(\Delta T_1-\Delta T_2)$, we arrive at expression (6) for determining the health check value $\Delta T$, where $\Delta T$ is the time available for depleting an energy storage capacitor bank, such as capacitor storage bank 302, by a known voltage ($\Delta V$) at a discharge current $I_{DIS}$.

$$\Delta T = C*\Delta V/I_{DIS} \quad (6)$$

As an example, assuming that C of a capacitor storage bank is equal to 1000 µF, $\Delta V$ is equal to 1V, and $I_{DIs}$ equals 10 mA, the $\Delta T$ value is 100 ms, using Equation 4. This gives an accurate estimate of time available for back up if the same C is used for backup power. Thus, with a system load current draw of 1 A during a back-up operation, and assuming the storage (hold up) capacitor is discharged from an initial voltage $V_2$ of 30V to a final voltage $V_1$ of 10V, for a total $\Delta V$ of 20V, the time available for backup ($\Delta T$) is $\Delta T*(20V/1V)/(1000$ mA/10 mA)=20 ms.

With this calculation of time required for a system to back up, it is possible to get the result $\Delta T_{HC}=\Delta T_1*\Delta T_2/(\Delta T_1-\Delta T_2)$ using the health check and then compare this measured result to determine whether the effective storage energy is enough to back up reliably. To revert back to the example, assuming 20 ms is an adequate time for system backup when needing 1 A current for 20 ms to complete backup operation while depleting the capacitor from 30V to 10V ($\Delta V=20V$), then this can be translated to a metric $\Delta T_0$ that can be used to determine if adequate energy is available after a health check. $\Delta T_0$ is calculated as 20 ms*(1 A/10 mA)*(1/20) for a health check $\Delta V=1V$. During a health check, $\Delta V=1V$ and discharge current is 10 mA, then the measured time $\Delta T_{HC}=\Delta T_1*\Delta T_2/(\Delta T_1-\Delta T_2)$ must be greater than 20 ms*(1 A/10 mA)*(1/20)=100 ms. By calculating the value $\Delta T_{HC}=\Delta T_1*\Delta T_2/(\Delta T_1-\Delta T_2)$ using two-step health check process and comparing this to 100 ms to determine if this calculated value is higher or lower than 100 ms, allows the system controller 106 to accurately determine whether the available energy in the storage capacitor is adequate for a backup operation.

When this measurement technique is error ridden as prior solutions are, excessive capacitance must be added to account for error margins. For example, where the health check accuracy is 15%, then the calculated $\Delta T_{HC}=\Delta T_1*\Delta T_2/(\Delta T_1-\Delta T_2)$ must be greater than 115 ms (15% higher than 100 ms) and 15% higher capacitor value is required. Also in traditional health check measurement process, the capacitor is discharged from $V_{STR\_NOM}$ to ~95% of $V_{STR\_NOM}$ to do the health check. To account for the possibility of a backup event starting at the end of the health check process when the voltage is the lowest at 95% of $V_{STR\_NOM}$, more capacitance may need to be added to ensure there is enough back up energy even in the event that a backup event (power loss) starts at the very end of a health check process. Since energy stored on a capacitor is equal to $EC=C*V_2$, C must be increased by a factor of 1/(0.95)² or 1.1 (10% more). This can increase the size and cost of storage capacitor needed by ~25%. By boosting the voltage of the storage capacitor higher than $V_{STRNOM}$ and maintaining the storage capacitor voltage higher than $V_{STRNOM}$ at all times-even during a health check and by maintaining high accuracy of the health check process, the required storage capacitor size can be reduced to save cost and precious board space on storage drives.

Using expression 6 to determine $\Delta T$ provides a low error and high precision value for $\Delta T$. For example, in one embodiment, $\Delta T$ is accurate to within a 3% margin of error (compared to 10% or greater in prior systems and methods). However, with the use of high precision resistors and other componentry within the power regulator 304, the margin of error may be reduced to a value below 3%. Further, the above calculated result provides high accuracy and little to no error due to several factors, described above, such as determination and cancellation of leakage current $I_L$, use of a common comparator (e.g., comparator 328) to eliminate voltage offset issues associated with using multiple comparators, and increased time accuracy due to using through the use of high accuracy internal clock of the power regulator 304 or the accurate crystal oscillator-based clock in the controller 106. Furthermore, errors in $\Delta V$-$\Delta V$ are addressed by making $\Delta V$-$\Delta V$ proportional to a known $V_{REF}$ voltage and a multiple created by closely matched resistors (e.g., match resistors 336, 340) described above. Finally, the above equations are linear and therefore require fewer computing resources and time to complete, allowing for a simpler more efficient method for determining $\Delta T$ that is also more accurate than existing methods, for reasons described above.

The power regulator 146 and/or controller 106 may use the determined $\Delta T$ value in combination with known $\Delta V$ and $I_{DIS}$ values, to calculate a capacitance value of the storage capacitor bank 302. The calculated capacitance value may then be used to determine whether the data storage device 102 has enough stored energy to ensure a safe power down without a loss or corruption of data. In some instances, the data storage device 102, upon determining that there is not sufficient stored energy to ensure a safe power down, may enter a read only mode to avoid potential data loss or corruption.

The above equations and implementations represent one way to calculate $\Delta T$ using two or more constant current discharge cycles. However, it is understood that various other calculations, discharge cycles, or other implementations may also be used in conjunction with constant current discharged to determine a value for $\Delta T$.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
a non-volatile memory device;
a capacitor bank;
a power regulator electrically coupled to the capacitor bank and configured to provide power to the non-volatile memory device; and
a controller configured to:
control the power regulator to discharge the capacitor bank from a first voltage to a second voltage at a first constant current across a health check resistor,
determine a first discharge time, wherein the first discharge time is a time to discharge from the first voltage to the second voltage at the first constant current,
control the power regulator to discharge the capacitor bank from the first voltage to the second voltage at a second constant current across the health check resistor,
determine a second discharge time, wherein the second discharge time is a time to discharge from the first voltage to the second voltage at the second constant current, and
determine a voltage holdup time of the capacitor bank based on the first discharge time and the second discharge time.

2. The data storage device of claim 1,
wherein a difference between the first voltage and the second voltage is a predetermined voltage differential,
wherein the predetermined voltage differential is one of a fixed voltage differential or a percentage of a nominal voltage of the capacitor bank, and
wherein the predetermined voltage differential is a non-zero value.

3. The data storage device of claim 2, wherein the first voltage is greater than a nominal voltage of the capacitor bank by a first percentage of the nominal voltage plus the predetermined voltage differential.

4. The data storage device of claim 1, further comprising a comparator, wherein the comparator is configured to transmit an output to the controller for determining the first discharge time and the second discharge time.

5. The data storage device of claim 3, wherein the controller is further configured to control the power regulator to increase a voltage of the capacitor bank to a boosted voltage level prior to discharging the capacitor bank, wherein the boosted voltage level is greater than the first voltage.

6. The data storage device of claim 5, wherein the boosted voltage level is greater than the nominal voltage of the capacitor bank by a second percentage of the nominal voltage plus the predetermined voltage differential.

7. The data storage device of claim 6, wherein the second percentage is greater than the first percentage.

8. The data storage device of claim 1, wherein the second constant current is greater than the first constant current by a ratio sufficient to remove errors due to capacitor leakage currents.

9. A method for determining a voltage holdup time of a holdup capacitor storage bank, the method comprising:
  controlling, with a controller, a power regulator to discharge the holdup capacitor storage bank from a first voltage to a second voltage across a health check resistor at a first constant current;
  determining, with the controller, a first discharge time, wherein the first discharge time is a time to discharge from the first voltage to the second voltage;
  controlling, with the controller, the power regulator to discharge the holdup capacitor storage bank from the first voltage to the second voltage across the health check resistor at a second constant current;
  determining, with the controller, a second discharge time, wherein the second discharge time is a time to discharge from the first voltage to the second voltage at the second constant current; and
  determining, with the controller, a voltage holdup time of the holdup capacitor storage bank based at least on the first discharge time and the second discharge time.

10. The method of claim 9, wherein a difference between the first voltage and the second voltage is a predetermined voltage differential,
  wherein the predetermined voltage differential is one of a fixed voltage differential or a percentage of a nominal voltage of the capacitor bank, and
  wherein the predetermined voltage differential is a non-zero value.

11. The method of claim 10, wherein the first voltage is greater than a nominal voltage of the holdup capacitor storage bank by a first percentage of the nominal voltage plus the predetermined voltage differential.

12. The method of claim 11, further comprising increasing a voltage of the holdup capacitor storage bank to a boosted voltage level prior to discharging the holdup capacitor storage bank, wherein the boosted voltage level is greater than the first voltage.

13. The method of claim 12, wherein the boosted voltage level is greater than the nominal voltage of the holdup capacitor storage bank by a second percentage of the nominal voltage plus the predetermined voltage differential.

14. The method of claim 13, wherein the second percentage is greater than the first percentage.

15. The method of claim 9, wherein the second constant current is greater than the first constant current by a ratio sufficient to remove errors due to capacitor leakage currents.

16. The method of claim 9, wherein the voltage holdup time of the holdup capacitor storage bank is determined using a formula $\Delta T = C^*\Delta V/I_{DIS}$, wherein $\Delta T$ is equal to the voltage holdup time, $C$ is a capacitance of the holdup capacitor storage bank, $\Delta V$ is a difference between the first voltage and the second voltage, and $I_{DIS}$ is a function of the first constant current and the second constant current.

17. A non-transitory computer readable medium storing instructions that when executed by a computer cause the computer to perform the method of:
  controlling, with a controller, a power regulator to discharge the holdup capacitor storage bank from a first voltage to a second voltage across a health check resistor at a first constant current;
  determining, with the controller, a first discharge time, wherein the first discharge time is a time to discharge from the first voltage to the second voltage;
  controlling, with the controller, the power regulator to discharge the holdup capacitor storage bank from the first voltage to the second voltage across the health check resistor at a second constant current;
  determining, with the controller, a second discharge time, wherein the second discharge time is a time to discharge from the first voltage to the second voltage at the second constant current; and
  determining, with the controller, a voltage holdup time of the holdup capacitor storage bank based at least on the first discharge time and the second discharge time.

18. The computer readable medium of claim 17, wherein a difference between the first voltage and the second voltage is a predetermined voltage differential, and
  wherein the predetermined voltage differential is a non-zero value.

19. The computer readable medium of claim 18, wherein the first voltage is greater than a nominal voltage of the holdup capacitor storage bank by a first percentage of the nominal voltage plus the predetermined voltage differential.

20. The computer readable medium of claim 17, further comprising increasing a voltage of the holdup capacitor storage bank to a boosted voltage level prior to discharging the holdup capacitor storage bank, wherein the boosted voltage level is greater than the first voltage.

* * * * *